US006646745B2

(12) United States Patent
Verma et al.

(10) Patent No.: US 6,646,745 B2
(45) Date of Patent: Nov. 11, 2003

(54) METHOD AND APPARATUS FOR LOCKING THE TRANSMISSION WAVELENGTH IN OPTICAL COMMUNICATION LASER PACKAGES

(75) Inventors: Kaushal Kumar Verma, Breinigsville, PA (US); Stephen James Salko, Weatherly, PA (US)

(73) Assignee: Triquint Technology Holding Co., Hillsboro, OR (US)

( * ) Notice: Subject to any disclaimer, the term of this patent is extended or adjusted under 35 U.S.C. 154(b) by 0 days.

(21) Appl. No.: 10/045,197

(22) Filed: Oct. 22, 2001

(65) Prior Publication Data

US 2003/0076502 A1 Apr. 24, 2003

(51) Int. Cl.[7] .................................................. G01B 9/02
(52) U.S. Cl. ....................................................... 356/450
(58) Field of Search ................................. 356/450, 484, 356/521, 451

(56) References Cited

U.S. PATENT DOCUMENTS 3,717,412 A * 2/1973 Takuma et al. ............. 356/300
4,009,940 A * 3/1977 Ohzu ......................... 359/578
6,215,801 B1   4/2001 Ackerman et al. ............ 372/32

FOREIGN PATENT DOCUMENTS

EP      1 052 526       11/2000

OTHER PUBLICATIONS

M. Imaki, S. Yamamoto, M. Sato, Y. Nishimura, K. Masuda, S. Takagi, A. Adachi, J. Yamashita and Y. Hirano, Wideband athermal wavelength monitor integrated wavelength temperature–tunable DFB–LD module, Electronics Letters, Aug. 2, 2001, pp. 1035–1036, vol. 37—No. 16.

* cited by examiner

Primary Examiner—Samuel A. Turner
Assistant Examiner—Michale A. Lyons
(74) Attorney, Agent, or Firm—Christie, Parker & Hale, LLP (57) ABSTRACT

The present invention is directed toward a monitoring and control system for an optical system. In one aspect of the present invention the system may include an interferometer that splits an input beam into a transmitted portion and a reflected portion. The interferometer introduces a path length difference between at least a segment of the transmitted and reflected portions that recombine to form an output beam having an intensity that varies as a function of wavelength of the input beam.

17 Claims, 10 Drawing Sheets

METHOD AND APPARATUS FOR LOCKING THE TRANSMISSION WAVELENGTH IN OPTICAL COMMUNICATION LASER PACKAGES

FIELD OF THE INVENTION

This invention relates generally to optical communications, and more specifically to a system and method for stabilizing the wavelength of a laser or light source.

BACKGROUND

Integrated optical devices for monitoring and controlling optical signals have become more important as optical fiber communications channels increasingly replace metal cable and microwave transmission links. For example, in many applications, a light source needs to be tuned to a particular wavelength and maintained at that wavelength for an extended period of operation. Unfortunately, it has been recognized that over long periods of usage, laser light sources gradually experience wavelength drift. Furthermore, variations in the operating temperature of a light source may also cause the output wavelength of the light source to fluctuate.

Therefore, several methods have been devised for monitoring and controlling the wavelength of light sources. One of the most common solutions utilizes an error feedback system to monitor and control the output wavelength of the light. For example, a typical control system may use an interferometer, that receives a transmitted optical beam and outputs a filtered optical signal having an amplitude that varies with the wavelength of the transmitted optical beam. The filtered optical signal may therefore be used to stabilize the wavelength of the transmitted opticalbeam.

More specifically, because the amplitude of the filtered optical signal is a function of the amplitude and wavelength of the transmitted optical signal, the ratio of the amplitude of the filtered optical signal to the amplitude of the transmitted optical beam depends on the wavelength of the transmitted optical beam. Therefore, the wavelength of the transmitted optical signal may generally be determined by monitoring the ratio of the filtered optical signal and the transmitted optical beam.

Fabry-Perot etalons are commonly used to provide the wavelength dependent filtered optical signal. An etalon is a type of interference filter in which the intensity of the light transmitted through the etalon is dependent on its wavelength. In a conventional design, an etalon is comprised of two partially reflective parallel surfaces a distance (d) apart and separated by a material with an index of refraction (n). In operation, when collimated light having a wavelength $\lambda$ is passed through the etalon, some of the light is reflected from the partially reflective parallel surfaces. The reflected light beams interfere, either constructively or destructively, with each other, and thus alter the overall intensity of the light passing through the etalon.

In operation, maximum transmission through the etalon occurs when the two way optical path (i.e. 2*nd) between the reflective surfaces is an integral number of wavelengths $\lambda$ in the etalon, (i.e.2d*n/$\lambda$=x, where x is an integer). Thus, referring to FIG. 1, for a given optical path length, the response curve (i.e. transmission intensity versus wavelength) is periodic having maximum that occur at a spacing given by $\Delta\lambda=\lambda^2/2$ (nd).

Figure 1:
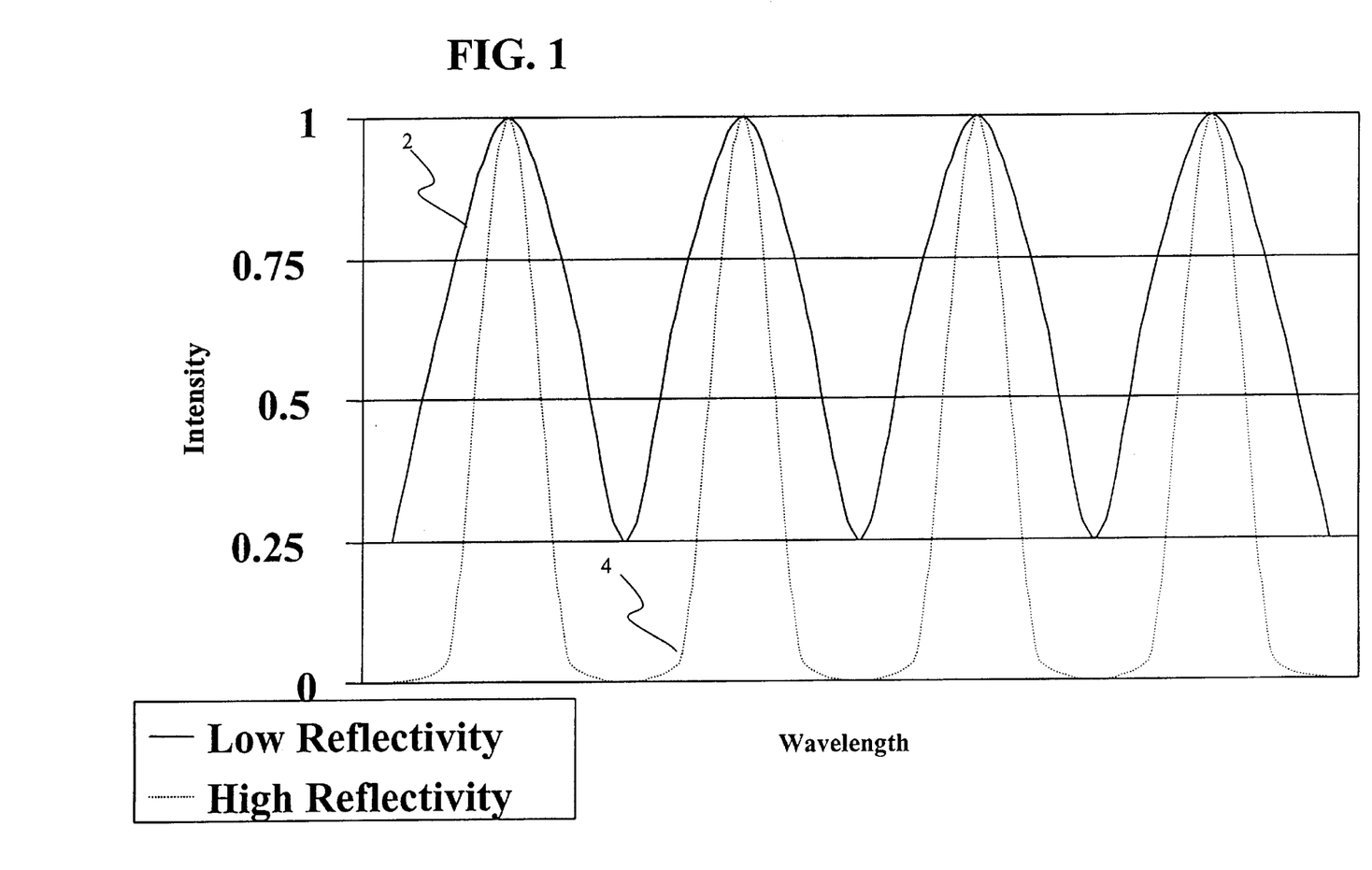
FIG. 1 graphically illustrates the intensity response of a Fabry-Perot etalon having both low reflectivity parallel surfaces and high reflectivity parallel surfaces.

FIG. 1 also shows how the reflectivity of the parallel surfaces affects the transmission. If the reflectivity of the parallel surfaces is relatively high, the maxima of the intensity response will be relatively narrow and sharp. In addition, the intensity response 4 may further include relatively low slope regions between the maxima wherein the intensity does not significantly vary with wavelength. Therefore, the ratio of the amplitude of the filtered optical signal to the transmitted optical beam, also will not vary much in these low slope region, making it difficult to accurately detect and control the output wavelength of the laser in these low slope regions.

In practice therefore, the reflectivity of the parallel surfaces is often reduced to optimize the intensity profile 2 for a particular wavelength stabilization system. However, as seen in FIG. 1, reducing the reflectivity of the parallel surfaces reduces the modulation depth, i.e. separation between minima and maxima, of the device. The reduced modulation depth decreases the systems ability to differentiate small changes in the frequency of the input light.

Therefore, it would be advantageous to provide an interferometer having an intensity response with improved modulation and increased usable bandwidth.

SUMMARY OF THE INVENTION

In one aspect of the present invention a monitoring and control apparatus for an optical system includes an interferometer that splits an input beam into a transmitted portion and a reflected portion, wherein the interferometer introduces a path length difference between at least a portion of the transmitted and reflected portions that recombine to form an output beam having an intensity that varies as a function of the wavelength of the input beam.

In another aspect of the present invention a monitoring and control apparatus for an optical system includes an interferometer having a first right angle prism with a first thickness optically coupled along an interface to a second right angle prism with a second thickness, wherein an input beam is incident upon the interface and split into a transmitted portion and a reflected portion, and wherein differences in the first and second thicknesses introduce a path length difference between at least a portion of the transmitted and reflected portions that recombine to form an output beam having an intensity that varies as a function of wavelength of the input beam.

In a further aspect of the present invention, a monitoring and control apparatus for an optical system includes an interferometer having a body with first and second diffraction gratings coupled to parallel opposing sides of the body, wherein the interferometer introduces a pathlength difference for at least a portion of positive and negative diffraction rays that recombine to form an output beam having an intensity that varies as a function of wavelength of the input beam.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

In accordance with an exemplary embodiment, an interferometer provides an improved intensity profile having relatively high modulation depth and increased usable bandwidth. The described exemplary interferometer splits an incoming optical beam into two parts that traverse different path lengths before recombining in a coherent fashion to generate a two beam interference. The intensity of the recombined beam is therefore dependent upon the wavelength of the incoming optical beam.

Figure 2:
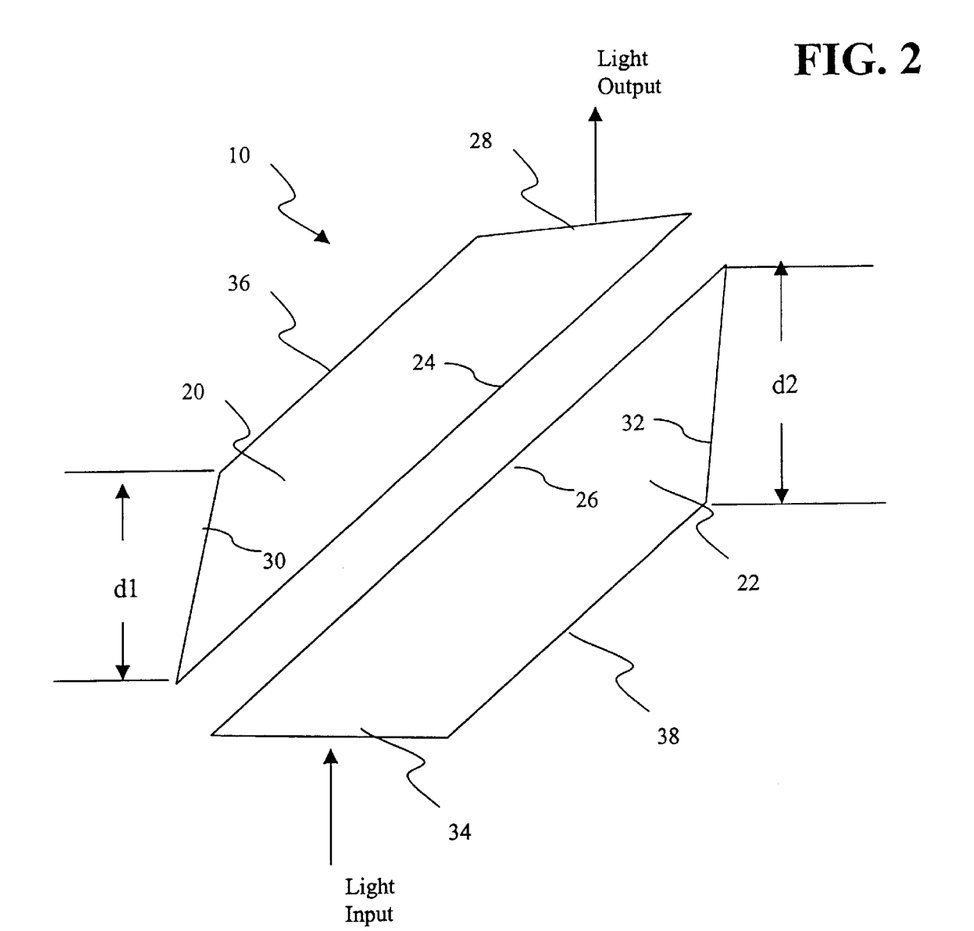
FIG. 2 is an exploded side view of an interferometer formed from two dove prisms of different thickness that are optically coupled along their long surfaces to introduce a difference in path length between beams that are split along the interface of the devices in accordance with an exemplary embodiment of the present invention.

For example, referring to the exploded view of FIG. 2, in an exemplary embodiment of the present invention two prisms, such as for example dove prisms 20 and 22, may be coupled together along the hypotenuse 24 and 26 respectively of each prism. In the described exemplary embodiment, the thickness of one of the prisms (for example d1 of prism 20) is less than the thickness of the other prism (for example d2 of prism 22).

The difference in thickness may be used to introduce a difference in path length between beams that are split along the interface of the devices. One of skill in the art will appreciate that any difference in the thickness of the two prisms may be utilized to obtain an periodic output intensity that is dependent upon the wavelength of the incident beam. However, for robustness, it is preferred that the difference in the thickness of the two prims be at least about an order of magnitude greater than the center wavelength.

In accordance with an exemplary embodiment, the prisms may be formed from polished high purity fused silica ($SiO_2$) or other materials known in the art such as for example, $LiCaAlF_6$. The prisms may be coupled together with an optical grade adhesive or epoxy or with an ultra-violet cured optical glue.

One of skill in the art will appreciate that the present invention is not limited to the described exemplary interferometer comprising two prisms having different thicknesses that introduce a path length difference into recombined signals. Rather, alternative techniques such as for example steps, coatings or prisms formed from materials having different indices of refraction may be used to introduce a path length difference in recombined signals to provide the necessary multiple beam interference.

In accordance with an exemplary embodiment the inclined faces 28, 30, 32 and 34 of each prism are symmetrically angled with respect to the hypotenuse. In the described exemplary embodiment an anti-reflective coating may be included on the inclined end faces 28, 30, 32 and 34 of the prisms to increase transmission into and out of the device. The inclined end faces may be swept at an angle in the range of about 40–50 degrees to ensure that rays are incident upon the outboard faces 36 and 38 at an angle more than the critical angle and totally reflected. Alternatively, a reflective coating, such as, for example, silver, gold, chromium, aluminum or tin may be deposited on the outboard faces 36 and 38 to ensure total internal reflection.

In addition, in the described exemplary embodiment, a partially reflective coating, such as, for example $SiO_2$, $TiO2$, $Al_2O_3$ or $MgF_2$ may be deposited on the hypotenuse 24 and 26 of one or both of the prisms 20 and 22 respectively. The partially reflective coating may be used to ensure that beams incident upon the interface between the prisms are equally split into reflected and transmitted beams. The partially reflective coatings may be deposited by a variety of known techniques including electron bombardment evaporation, ion beam sputtering, physical vapor deposition or other techniques known in the art. One of skill in the art will appreciate that the partially reflective coatings preferably possess not only the necessary refractive index but also have sufficiently low residual absorption at the desired wavelength.

Figure 3:
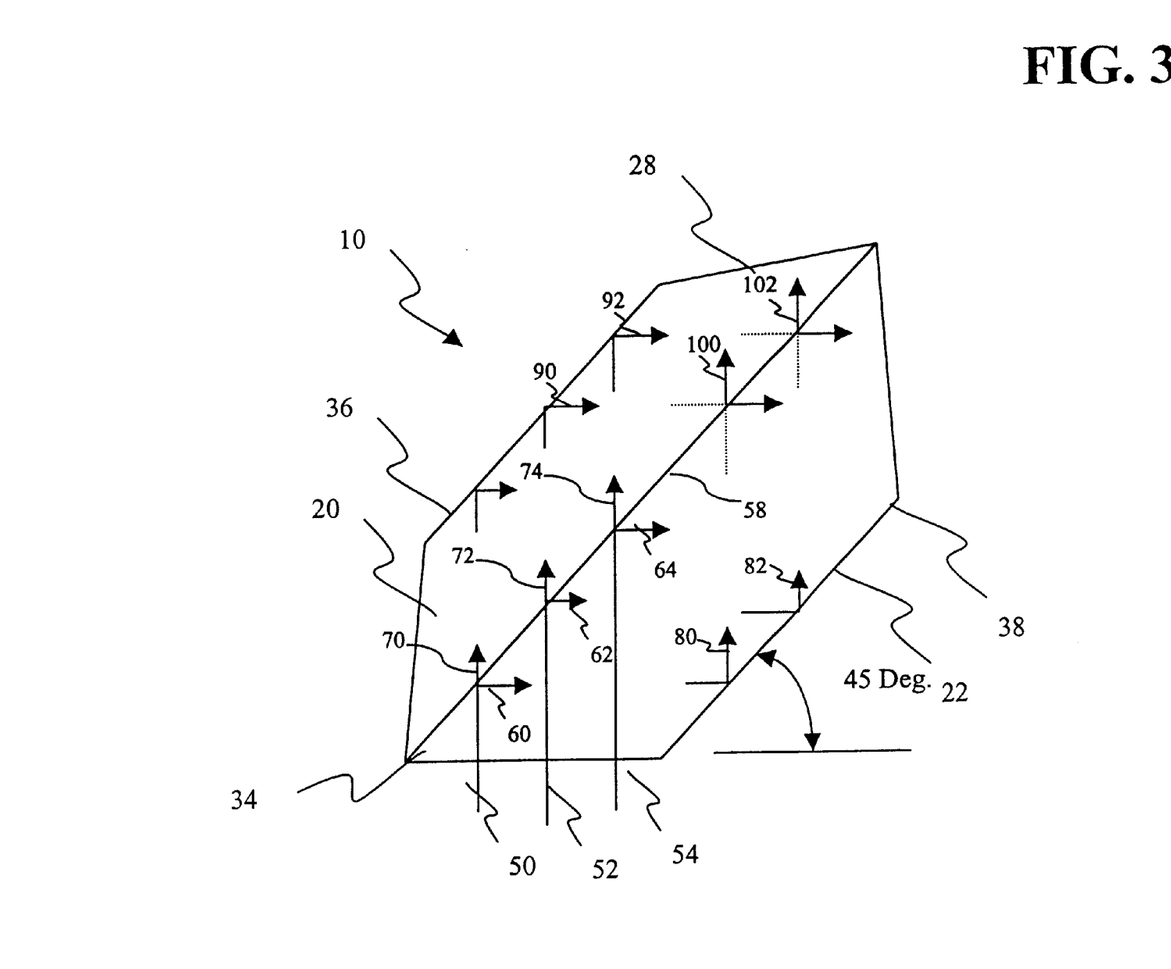
FIG. 3 is a ray diagram of the interferometer of FIG. 2 demonstrating the recombination of rays having different pathlengths to form an output signal whose intensity varies in accordance with the wavelength of the input signal in accordance with an exemplary embodiment of the present invention.

Operation of the described exemplary interferometer is graphically illustrates in the ray diagram shown in FIG. 3. In accordance with an exemplary embodiment, collimated parallel rays of light (e.g. 50, 52 and 54) are incident upon sloped face 34 of the double prism interferometer at substantially normal incidence. One of skill in the art will appreciate that the described exemplary interferometer is not however, limited to configurations wherein the incoming rays are incident upon sloped face 34 at normal incidence. Rather, incoming light can enter the interferometer at incidence angles ranging from about 80–100 degrees. However, in this instance the geometric relationship of the other angles of the two prisms may have be adjusted to ensure proper interference between rays that recombine at the interface.

The incoming parallel rays (50, 52 and 54 shown for purposes of illustration) are coupled into the prism by an anti-reflective coating on sloped face 34 and are then incident upon the interface 58 between the prisms at an angle of 45 degrees. In the described exemplary embodiment the interface is treated with a partially reflective coating so that each of the incident rays 50, 52 and 54 are split into reflected rays 60, 62 and 64 and transmitted rays 70, 72 and 74 respectively that are substantially equal in amplitude. In the described exemplary embodiment, the reflected rays 60, 62 and 64 are incident upon and redirected by the sidewall 38 of the first prism at an angle of 45 degrees. Similarly, the transmitted rays 70, 72 and 74 are incident on and redirected by sidewall 36 of the second prism at angle of 45 degrees.

The redirected rays in the described exemplary embodiment are therefore parallel to the incoming rays. A portion of the redirected rays 80, 82 and 90, 92 respectively may then recombine at the interface of the prisms. The recombined rays 100 and 102 are then output through sloped surface 28 of the second prism.

One of skill in the art will appreciate that the present invention is not limited to a 45 degree angle of incidence on the sidewall surface 36 and 38 of the two prisms. In the described exemplary embodiment the angle of incidence on the sidewalls is preferably greater than the critical angle to ensure total internal reflection at the sidewalls.

In operation rays that propagate through prism 20 traverse a shorter path length than rays that propagate through prism 22 in accordance with the difference in thickness of the two prisms. The difference in the thickness of the two prisms results in the recombination of redirected rays (for example rays 80 and 90) at the interface 58 of the prisms that are generated from different incoming rays (50 and 52 respectively). Therefore a portion of the redirected rays (for example rays 80, 82 and 90, 92) traverse different path lengths and have different phase angles upon recombination. These redirected rays therefore constructively or destructively recombine at the interface to form an output optical beam whose intensity varies as a function of the wavelength of the incoming beam.

One of skill in the art will appreciate that the reflectivity of the interface determines the modulation depth. For optimum modulation depth, the intensity of the transmitted and reflected beams should be equal and a 50% reflectivity is required at the interface. However, if a design can tolerate less modulation depth, a different reflectivity may be used.

The intensity (Io) of the output light may be characterized as a function of the intensity (I) and wavelength (λ) of the incident beam as well as the physical thickness of the two prisms (d2) and (d1) that form the interferometer as follows:

$$I_o = I\left[1 + \cos\left\{\frac{4\pi}{\lambda}(d2 - d1)\right\}\right]$$

Therefore, if the dimensions of the interferometer are known a detector may be locally positioned to receive an output optical signal from the interferometer whose intensity may be used to determine the wavelength of the incoming beam. In addition, the described exemplary method of two beam interference provides an output optical signal with improved modulation depth and greater bandwidth than typically available from conventional interferometers.

Figure 4:
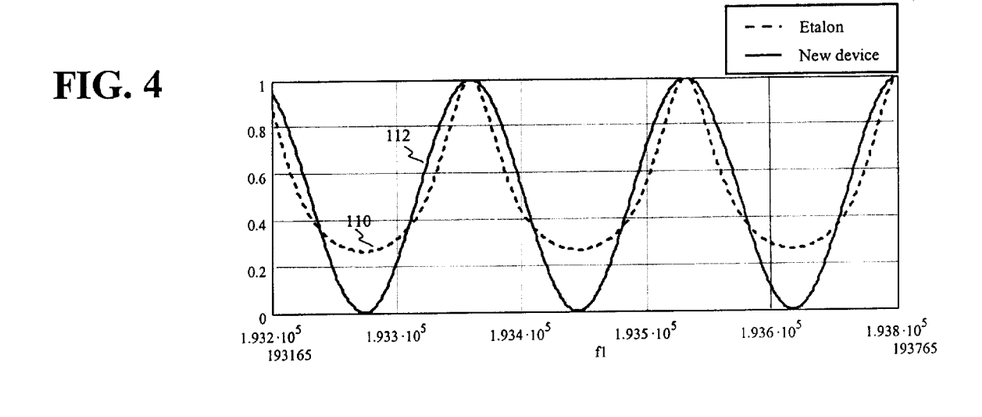
FIG. 4 graphically illustrates the normalized intensity response of a conventional etalon and an exemplary two prism interferometer in accordance with an exemplary embodiment of the present invention.

For example, FIG. 4 graphically illustrates the normalized output intensity versus frequency of a conventional Fabry-Perot etalon 110 and the described exemplary double prism interferometer 112. The described exemplary interferometer improves the quality of the transmission function providing greater modulation depth of the intensity response. The improved modulation provides improved detection of relatively small changes in the frequency of the incoming light beam as compared to the conventional etalon.

Further, the intensity response of both the conventional etalon and the described exemplary interferometer contain multiple peaks and valleys. In operation it is difficult to determine wavelength in the vicinity of these regions since the intensity value does not significantly change over a range of frequencies in these regions. For example, in typical wavelength monitoring and control applications, the minimum slope requirement of an interferometer (i.e. change in output intensity versus change in frequency) is in the range of about 0.25–1.0% change in frequency per GHz change in frequency.

Figure 5:
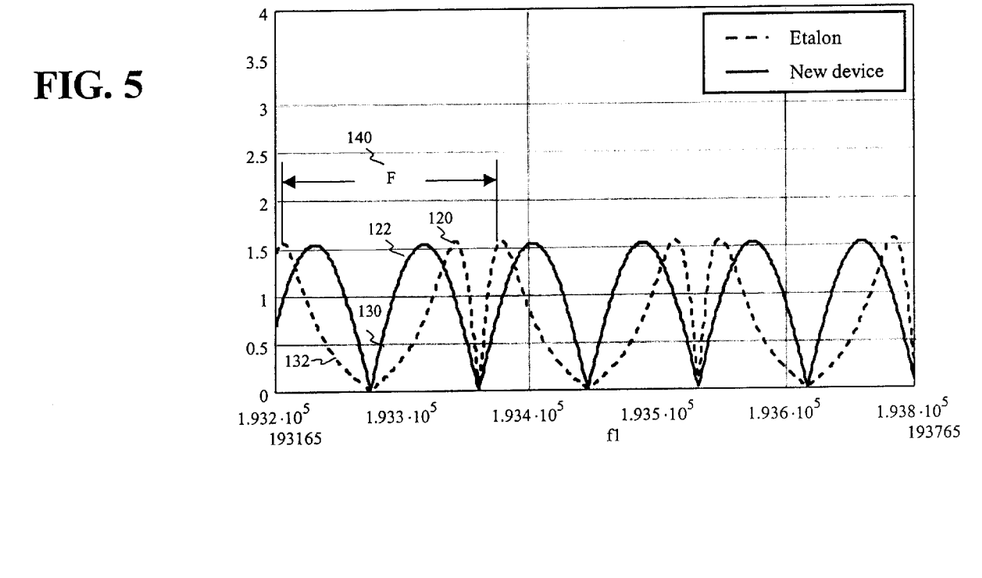
FIG. 5 graphically illustrates the slope (i.e. change in intensity versus change in frequency) of the normalized intensities of FIG. 4.

FIG. 5 graphically illustrates the slope of the intensity response (i.e. change in output intensity versus change in frequency) of the etalon 120 and the described exemplary interferometer 122 shown in FIG. 3. The described exemplary interferometer provides narrowed troughs or low slope regions 130 as compared to the conventional etalon 132. For example, assuming a minimum slope requirement of 0.5%/GHz and a frequency span (F) of approximately 205 GHz (region 140), the conventional etalon provides a usable bandwidth on the order of about 116 GHz and the described exemplary interferometer provides a usable bandwidth on the order of about 162 GHz for an increase of approximately 40%.

In accordance with an exemplary embodiment, the thickness and length of the two prism interferometer are typically constrained by the dimensions of the subassembly in which it is integrated. However, the physical dimensions of the interferometer may be chosen for a specific application such that the desired transmission frequency lies in a high slope area of the intensity response. In operation however, the desired transmission frequency may fall in a low slope region due to manufacturing variability, installation tolerances or thermal variations in the physical dimensions of the prisms.

Therefore, in one embodiment of the present invention, either one or both of the side surfaces 36 and 38 of the dove prisms may be stepped so that each step on the prism provides a region of different thickness and a different two beam interference. By appropriately adjusting the thicknesses of the prisms, each step can be configured to pass different frequencies of light.

Figure 6:
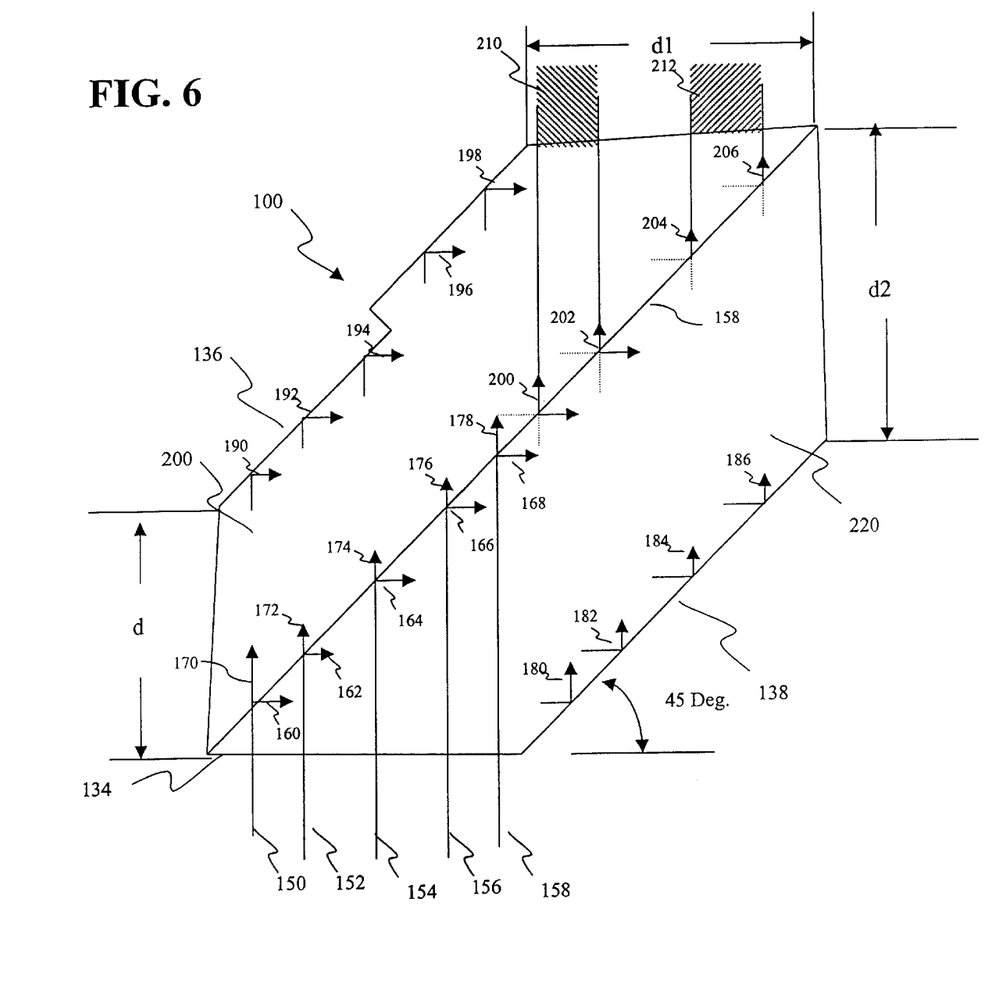
FIG. 6 is a side view of an alternate two prism interferometer having a step in one of the side surfaces of one of the prisms of FIG. 2 to provide a second output whose intensity varies in accordance with the wavelength of the input signal in accordance with an exemplary embodiment of the present invention.

For example, referring to the ray diagram of FIG. 6, in an exemplary embodiment of the present invention, a step on the order of about 150 nm thick is introduced in the side surface of prism 20 previously illustrated in FIG. 2. One of skill in the art will appreciate that the step may be introduced in the other prism without modifying the end result.

In accordance with an exemplary embodiment, a collimated parallel ray light beam is incident upon sloped face 58 of the double prism interferometer at substantially normal incidence. The incoming parallel rays (e.g. 150, 152, 154, 156 and 158 illustrated) are coupled into the prism by an anti-reflective coating on sloped face 134 of prism 220 and are then incident upon the interface 158 between the prisms at an angle of 45 degrees. In the described exemplary embodiment one or both of the surfaces that are coupled together at the interface are treated with a partially reflective coating so that each of the incident rays are split into a reflected ray 160–168 and transmitted ray 170–178 that are substantially equal in amplitude.

In the described exemplary embodiment, the reflected rays 160–168 are incident upon and redirected by the sidewall 138 of the first prism 220 at an angle of 45 degrees. Similarly, the transmitted rays 170–178 are incident upon and reflected by the sidewall 136 of the second prism 200 also at an angle of 45 degrees. In operation, the difference in prism thickness d<d1<d2 is such that rays traverse three different optical path lengths in accordance with the thickness of the prism.

Therefore, a first portion of redirected rays (for example, 180, 182 and 192, 194) will recombine at the interface with a first difference in phase and a second portion of rays (for example rays 184, 186 and 196, 198) will recombine at the interface having a second difference in phase. In the described exemplary embodiment the area over which the redirected rays constructively or destructive recombine with the first phase difference (area 210 for example) is spatially separate from the area over which the redirected rays constructively or destructively recombine with the second phase difference (area 212 for example). Therefore, if the dimensions of the interferometer are known separate detectors may be locally positioned within these areas to receive output optical signals from the interferometer whose intensities may be used to determine the wavelength of the incoming beam.

Figure 7:
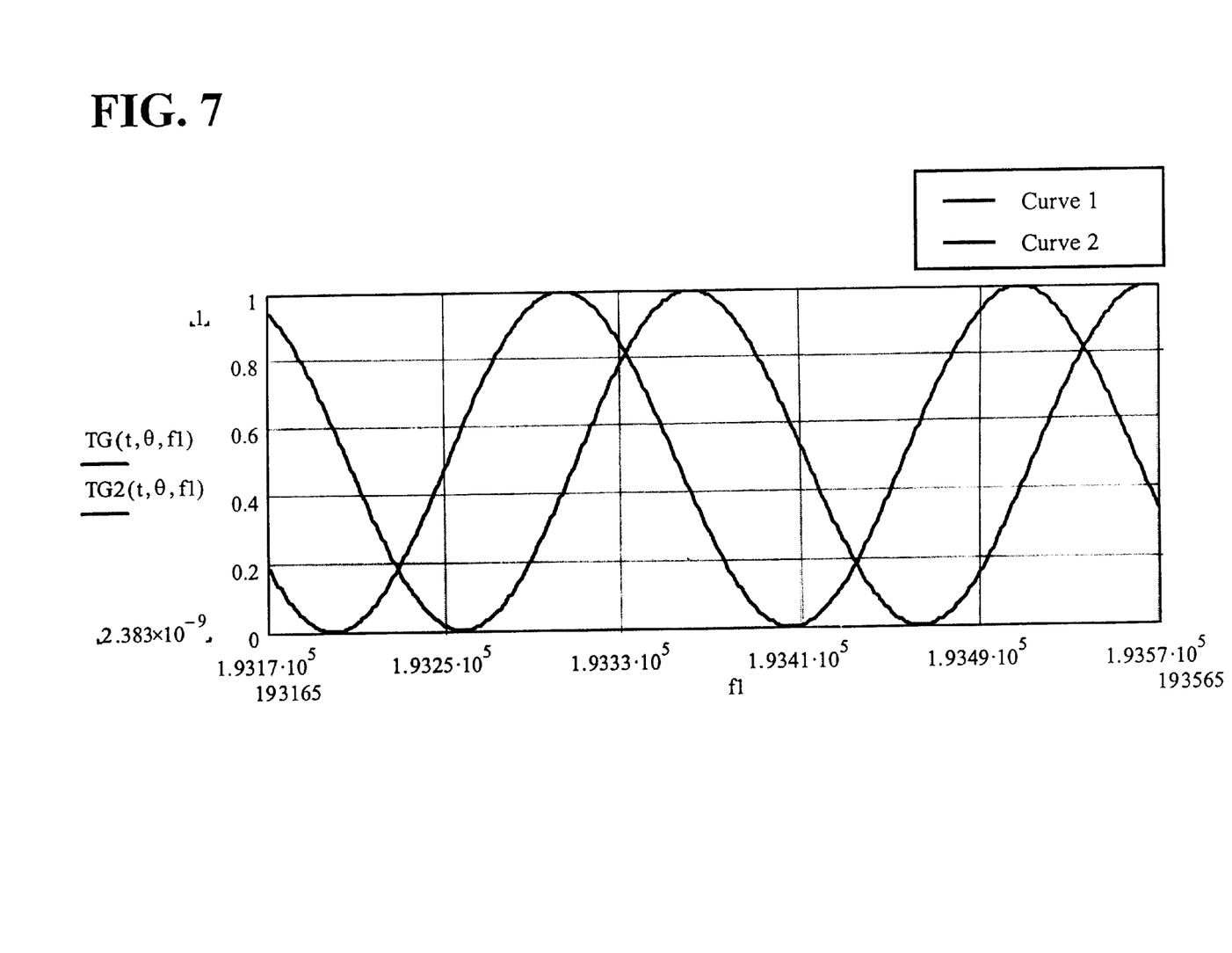
FIG. 7 graphically illustrates the intensity response of the step interferometer of FIG. 6 in accordance with an exemplary embodiment of the present invention.

For example, FIG. 7 illustrates a representative output of the intensity versus wavelength for the described exemplary two prism interferometer having a single step in one of the prisms as illustrated in FIG. 6. The single step creates a second periodic intensity curve shifted relative to a first intensity curve along the wavelength axis.

In accordance with an exemplary embodiment, the thickness of the step (e.g. an integer multiple of $\lambda/8$ for the illustrated embodiment) is chosen such that the high slope regions of the second intensity response coincide with the peaks and valleys of the first intensity response. In this manner, when changes in the interferometer shift the intensity response for one step beyond the desired range, the curve for a second step is shifted into the desired frequency thereby minimizing the impacts of manufacturing variability, installation mismatches etc.

One of skill in the art will appreciate that the present invention is not limited to the disclosed exemplary embodiment comprising first and second dove prisms coupled together along the hypotenuse of each prism. Rather, the present invention may utilize a variety of alternative prisms to split an incoming optical beam into two or more beams that may then be used to generate a two beam interference. For example, referring to FIG. 8, in an alternate embodiment of the present invention two alternate right angle prisms 310 and 320, may be coupled together to form an alternate double prism interferometer 300.

Figure 8:
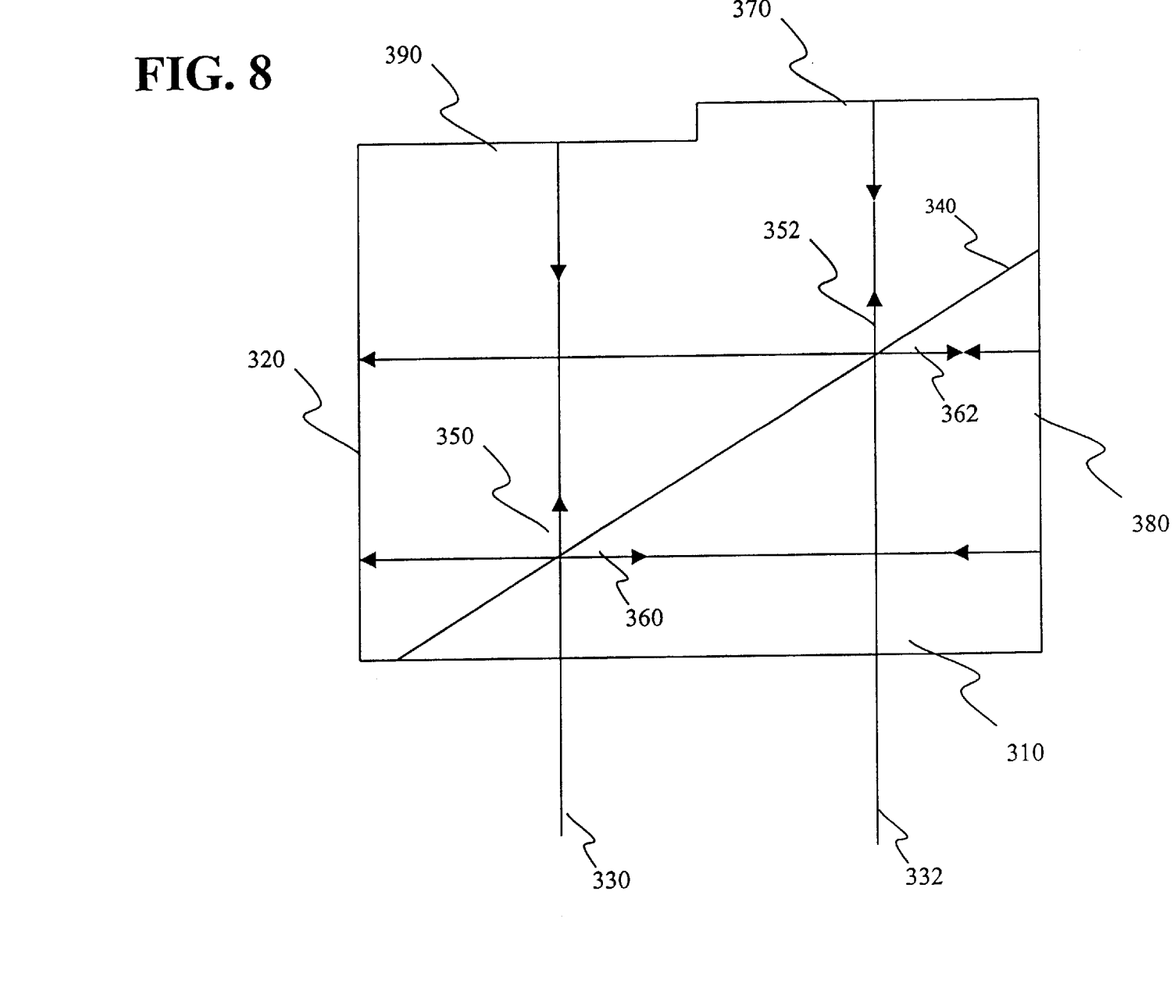
FIG. 8 is a side view of an alternate two prism interferometer for proving two beam interference in accordance with an exemplary embodiment of the present invention.

In operation, collimated incoming parallel rays (330 and 332 illustrated) are again incident on the prism interface 340 at an angle of approximately 45 degrees. One or both of the surfaces that are coupled together at the interface may again be coated with a partially reflective coating such that the boundary conditions at the interface split the incoming rays into substantially equal transmitted rays 350 and 352 and reflected rays 360 and 362.

The transmitted and reflected rays are then incident upon the sidewalls 370 and 380 of the prisms respectively at approximately normal incidence. The sidewalls may include a reflective coating such as for example aluminum to redirect the rays back to the interface where they recombine. The recombined rays then exit the interferometer. The redirected rays will again recombine with different phase angles in accordance with the difference in pathlength traversed. Therefore, the redirected rays will again constructively or destructively recombine at the interface as a function of the wavelength of the incoming beam providing a periodic output whose intensity varies as a function of the wavelength of the incoming signal.

In the alternate embodiment, one or more steps 390 may again be included in one of the surface of at least one of the prisms. In accordance with an exemplary embodiment the thicknesses of the prisms may be adjusted so that each step passes different frequencies of light (i.e. outputs a different intensity response). The thickness of the step may again be chosen such that the high slope regions of the second intensity response coincide with the peaks and valleys of the first intensity response.

Figure 9A:
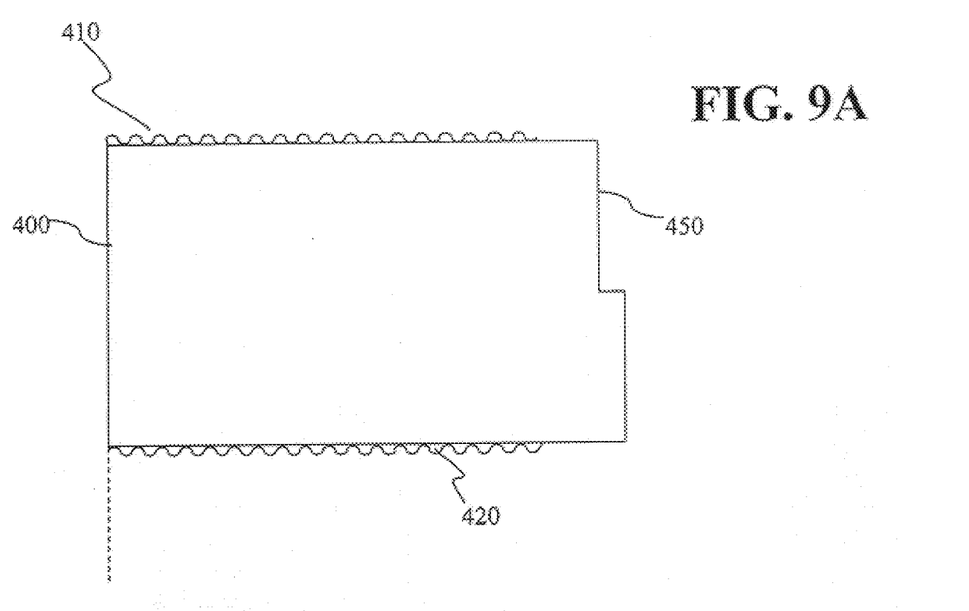
FIG. 9A is a side view of an alternate interferometer that utilizes diffraction gratings to split an incoming optical beam into two parts that traverse different path lengths before recombining in a coherent fashion to generate a two beam interference in accordance with an exemplary embodiment of the present invention.

One of skill in the art will appreciate that the present invention is not limited to the described exemplary two prism interferometers. Rather alternate approaches may be utilized to create an output signal generated from two beam interference. For example, the side view of FIG. 9 illustrates an alternate embodiment wherein an interferometer may comprise a block 400 of high purity fused silica ($SiO_2$) with a diffraction grating 410 and 420 formed on two parallel faces. As is known in the art, when monochromatic light is incident on a grating surface, it is diffracted into discrete directions. The light diffracted by each groove combines to form a diffracted wavefront.

In operation there exists a unique set of discrete angles along which, for a given spacing d between grooves, the diffracted light from each facet is in phase with the light diffracted from any other facet, so they combine constructively. In fact, there may be several discrete wavelengths which, when multiplied by successive integers m, satisfy the condition for constructive interference. For example, when the path difference is one wavelength, we speak of the positive first diffraction order (m=1) or the negative first diffraction order (m=−1), depending on whether the rays are advanced or retarded as we move from groove to groove.

In accordance with an exemplary embodiment the diffraction grating is unidirectional and optimized to achieve maximum light intensity in the positive first diffraction order (m=1) or the negative first diffraction order (m=−1).

Figure 10:
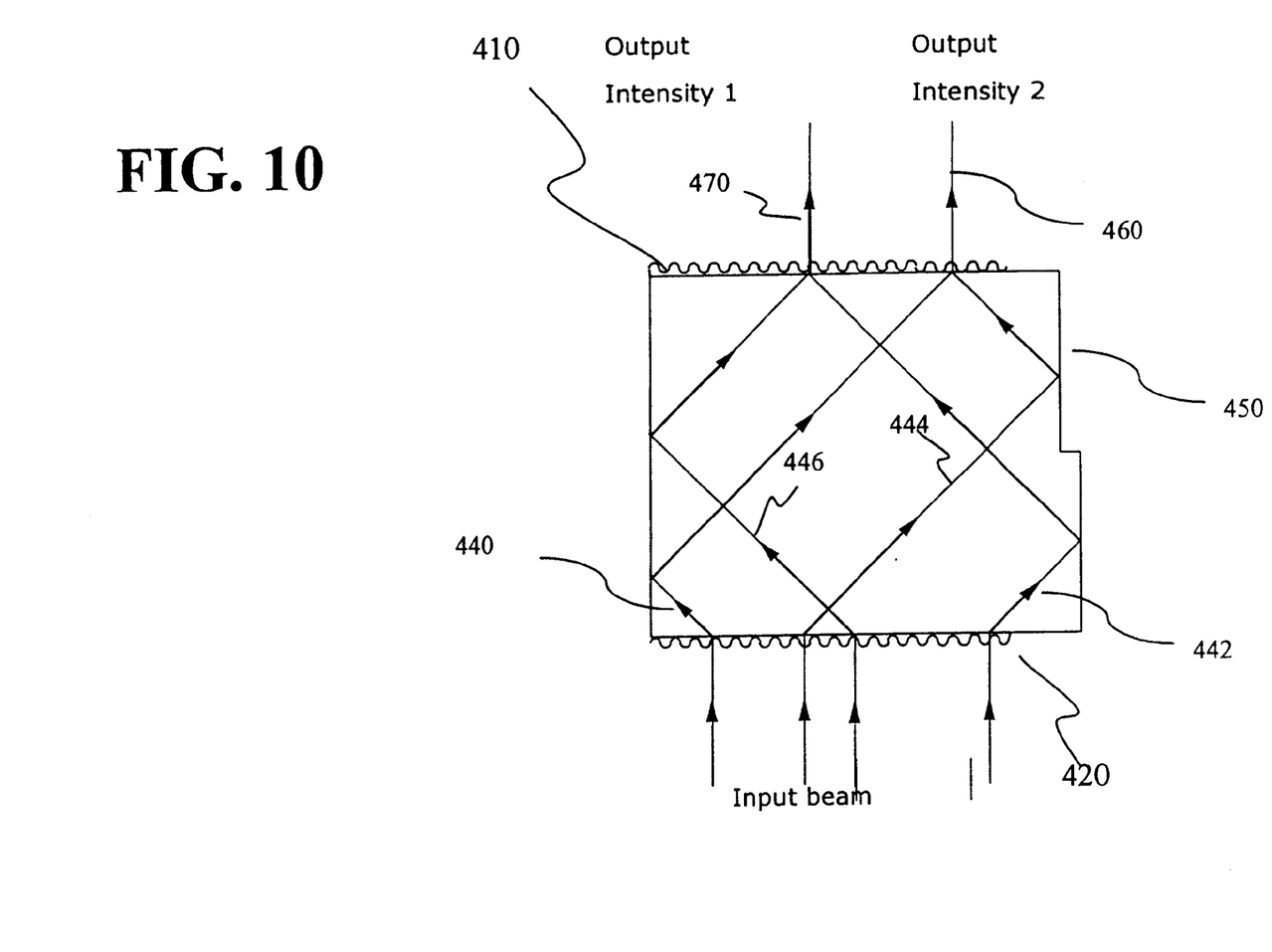
FIG. 10 is a ray diagram demonstrating the operation of the interferometer of FIG. 9A in accordance with an exemplary embodiment of the present invention.

Referring to the ray diagram of FIG. 10, in operation a collimated light beam is incident on the input grating 420. The input grating diffracts the light producing two beams (e.g. the +1 and −1 diffraction orders in the described exemplary embodiment) of equal intensity. Zero order diffraction is also produced but it is ignored here due to it's low intensity. In the described exemplary embodiment the two diffracted beams recombine at the second diffraction grating after undergoing total internal reflection on the sidewalls of the glass block.

In accordance with an exemplary embodiment the block is not a perfect cube and the gratings 410 and 420 are located off the center of the block along its longer side. Therefore, the two diffracted beams (e.g. 440 and 446) travel different path lengths and hence have a phase difference when they recombine at the second grating. Therefore, the positive and negative first order diffraction beams interfere with each other constructively and destructively as a function of the wavelength of the incoming light.

Figure 9B:
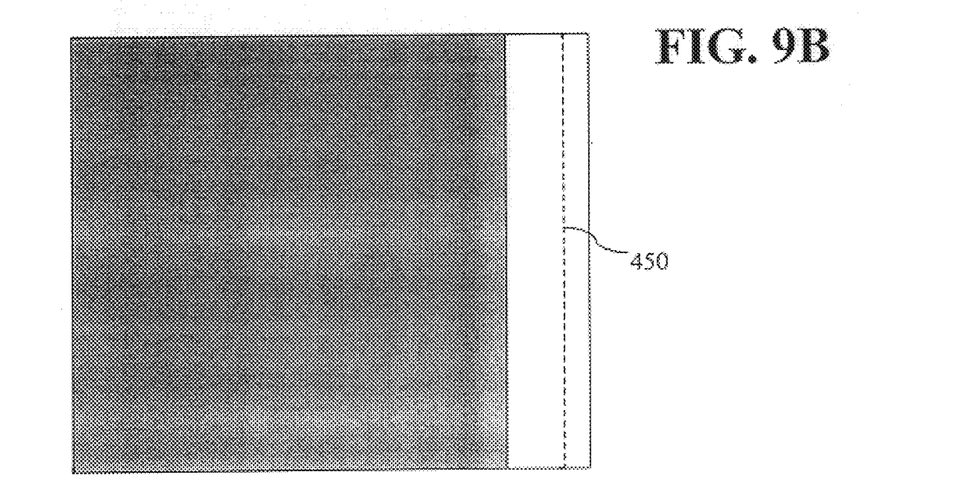
FIG. 9B is a front view of the interferometer illustrated in FIG. 9A in accordance with an exemplary embodiment of the present invention.

Referring back to FIG. 9A and the front view in FIG. 9B, in the described alternate embodiment, a step 450 may be introduced in one of the faces perpendicular to the grating faces. In accordance with an exemplary embodiment, the grating lines are oriented such that one of the first order diffractions (ray 444 is illustrated) is directed toward the stepped face (see FIG. 10). In this instance rays 440 and 444 recombine at the second diffraction grating after undergoing total internal reflection on the sidewalls of the glass block. In the described exemplary embodiment the step in the thickness of the block is configured to pass different frequencies of light than the non step region.

The step therefore again provides a second intensity response 460 that is shifted in wavelength from the first intensity response 470. In accordance with an exemplary embodiment, the thickness of the step may again be chosen such that the high slope regions of the second intensity response coincide with the peaks and valleys of the first intensity response to increase the usable bandwidth of the interferometer.

The described exemplary two beam interference approach may be utilized in any optical communication system to accurately detect the wavelength of an optical beam. For example, referring to FIG. 11, in one exemplary embodiment, the interferometer may be used in a wavelength stabilization system to monitor and control the output wavelength of an optical transmitter 510. In the described exemplary embodiment the laser 510 may be of a conventional type, such as a distributed feedback (DFB) laser, or a distributed Bragg reflector (DBR) laser, or the like.

Figure 11:
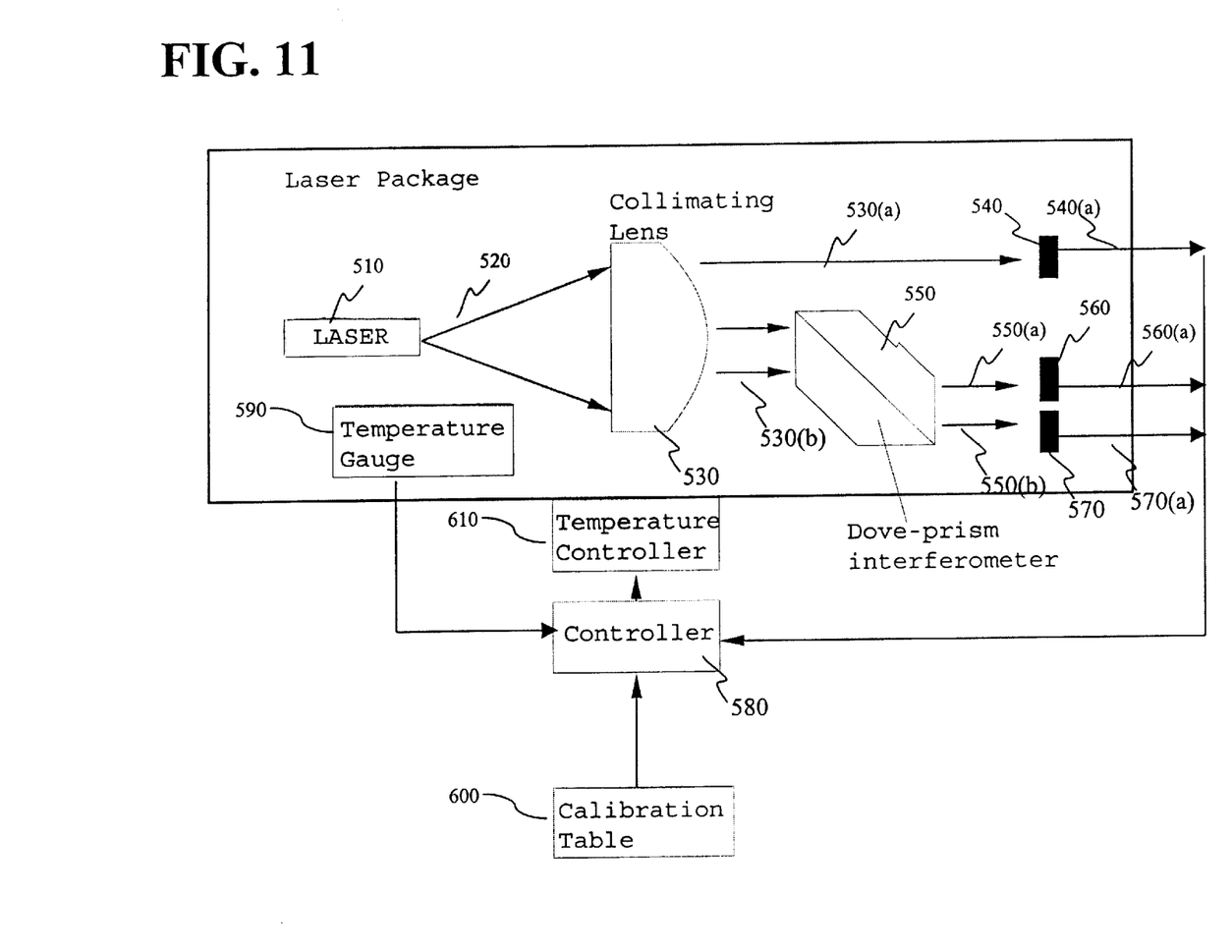
FIG. 11 is a simplified diagram of laser monitoring and control system utilizing the step interferometer of FIG. 6 in accordance with an exemplary embodiment of the present invention.

In the described exemplary embodiment, the laser 510 radiates a beam 520 to be monitored along an optical path to a collimating lens 530 that outputs a first portion 530 (*a*) of a collimated monitor beam to a first detector 540 and a second portion 530 (*b*) of a collimated monitor beam to the described exemplary interferometer 550. In accordance with an exemplary embodiment the interferometer may comprise two dove prisms with one prism having a step (as previously described with respect to FIG. 6) to output a first split beam 550(*a*) having a first intensity response to a second detector 560 and a second split beam 550(*b*) having a second intensity response to a third detector 570. In the described exemplary embodiment the value of the step is chosen such that the high slope regions of the second intensity response coincide with the peaks/valleys of the first intensity response.

The detectors provide outputs that are proportional to the intensity of the incident laser light. The detectors 540, 560 and 570 may be, for example, conventional P-I-N (p-intrinisic-n) diodes, which may be formed from a plurality of group III–V compound semiconductors, such as, for example, GaAs/AlGaAs, InGaAs/AlGaAs or InP/InGaAsP or other direct bandgap semiconductor materials. Alternatively, other suitable detectors such as, for example, metal-semiconductor-metal (MSM) photodetectors or avalanche photodiodes may also be used.

The output of the detectors are coupled to a controller 580, such as, for example, a personal computer or dedicated microprocessor. Because the intensity of the first and second split beams vary as a function of the amplitude and wavelength of the laser light 520, the ratio of the amplitude of the interferometer output 560(*a*) and 570(*a*) to the amplitude of the laser light 540(*a*) depends on the input wavelength. The controller 580 therefore monitors the ratio to generally determine the wavelength of the transmitted beam that is being controlled. However, because the intensity response of the described exemplary interferometer is periodic, several wavelengths may result in the same ratio. Therefore, the described exemplary wavelength control system may utilize other known data to determine which of these wavelengths produced that ratio.

For example, the output wavelength of typical optical transmitters generally varies as a function of the temperature of the device. Therefore, in the described exemplary embodiment, a temperature gauge 590 may be thermally coupled to the laser 510 to determine the operating temperature of the laser. In this embodiment the controller may approximate the output wavelength of the laser 510 in accordance with the measured temperature of the laser. The controller may then determine the actual wavelength in accordance with the observed ratio that is nearest to the approximated wavelength.

In some instances variation in the dimensions of the interferometer as well installation inaccuracies may diminish the ability of the wavelength stabilization system to accurately tune the laser to the desired output wavelength. Therefore, in accordance with an exemplary embodiment, a calibration table 600 may be generated after the optical subassembly is manufactured. In the described exemplary embodiment the calibration table is coupled to the controller and stores a plurality of data points that correlate the output wavelength of the laser with the intensity levels detected by the detectors, and the temperature of the laser. The calibration table may be constructed by energizing the laser with an appropriate excitation signal and monitoring the light emanating from front side of the laser, the temperature of the laser as measured by the temperature gauge (FIG. 11), and the output signals of the detectors.

The laser wavelength controller 580 can, for example, control the temperature of the laser 510 or the excitation current supplied to the laser. If the laser is a Distributed Feedback (DFB) laser, as is often used in a dense wavelength division multiplexed (DWDM) laser communication system, the wavelength controller 580 preferably controls the temperature of the laser source. Therefore, in one embodiment the controller forwards an error signal to a temperature controller 600 that provides appropriate temperature adjustments to reduce the error signal, and drive the wavelength of the monitored beam 520 towards the desired operating wavelength.

In an exemplary embodiment, the temperature controller (which may be, for example, a thermoelectric cooler (TEC) 610), is thermally coupled to the laser 510 to control the temperature of the laser. The TEC 610 may be abutting or near to the laser, as shown in FIG. 11, or may be mounted outside of the housing (not shown). Because the entire package may be quite small, it is possible to have a high thermal conductance between the laser 510 and the TEC 610, even if the TEC 610 is not abutting the laser 510. The TEC 610 allows heating and cooling of the laser 510 as required to drive the output wavelength of the laser to the desired wavelength. Alternative heating devices may include for example, a resistance heater or the like (not shown).

Although an exemplary embodiment of the present invention has been described, it should not be construed to limit the scope of the appended claims. Those skilled in the art will understand that various modifications may be made to the described embodiment. Moreover, to those skilled in the various arts, the invention itself herein will suggest solutions to other tasks and adaptations for other applications. For example, the present invention may utilized in mechanical measurement system to measure the curvature or roughness of a variety of optical components such as for example a ball lens. System It is therefore desired that the present embodiments be considered in all respects as illustrative and not restrictive, reference being made to the appended claims rather than the foregoing description to indicate the scope of the invention.

What is claimed is:

1. A monitoring and control apparatus for an optical system, comprising:
    an interferometer comprised of a first prism having a first thickness coupled to a second prism having a second thickness, wherein the interferometer splits an input beam into a transmitted portion and a reflected portion
    and wherein a difference in the first thickness of the first prism and the second thickness of the second prism introduces a path length difference between the transmitted and reflected portions,
    and wherein the transmitted and reflected portions recombine to form an output beam having an intensity that varies as a function of wavelength of the input beam.

2. The monitoring and control apparatus of claim 1 wherein the first and second prisms are optically coupled along a partially reflective interface, and wherein the input beam is incident upon the partially reflective interface and is split into the transmitted portion and the reflected portion at the partially reflective interface.

3. The monitoring and control apparatus of claim 1 wherein at least one of the first thickness of the first prism or the second thickness of the second prism is stepped to transmit different frequencies.

4. The monitoring and control apparatus of claim 1 wherein said first prism comprises a first dove prism and wherein the second prism comprises a second dove prism.

5. The monitoring and control apparatus of claim 4 wherein the first and second dove prisms are optically coupled along a hypotenuse of said first and second dove prisms to form a partially reflective interface, and wherein the input optical beam is incident upon the interface and split into the transmitted portion and the reflected portion at the partially reflective interface.

6. The monitoring and control apparatus of claim 4 wherein thickness of at least one of said prisms is stepped to transmit different frequencies.

7. The monitoring and control apparatus of claim 1 further comprising;
    a collimating lens optically coupled to a laser, wherein said collimating lens receives laser output and forwards a collimated monitoring beam to a first detector and the input beam to said interferometer;
    a second detector optically coupled to output of said interferometer for receiving said output beam whose intensity varies as a function of the wavelength of the input beam; and
    a wavelength controller, coupled to output of said first detector and output of second detector, that generates an error signal for controlling output wavelength of said laser in accordance with intensity of said monitored beam and interferometer output signal.

8. The monitoring and control apparatus of claim 7 further comprising a temperature controller coupled to said wavelength controller that adjusts temperature of said laser in accordance with said error signal, and wherein the output wavelength of the laser varies in accordance with said laser temperature.

9. A monitoring and control apparatus for an optical system, comprising:
    an interferometer comprising a first right angle prism having a first thickness optically coupled along an interface to a second right angle prism having a second thickness,
    wherein an input beam is incident upon said interface and split into a transmitted portion and a reflected portion, and
    wherein differences in said first and second thicknesses introduce a path length difference between at least a portion of the transmitted and reflected portions that recombine to form an output beam having an intensity that varies as a function of wavelength of the input beam.

10. The monitoring and control apparatus of claim 9 wherein said first prism comprises a first dove prism having a first hypotenuse and said second prism comprises a second dove prism having a second hypotenuse and wherein said first and second dove prisms are coupled along the first hypotenuse and second hypotenuse.

11. The monitoring and control apparatus of claim 10 wherein thickness of at least one of said prisms is stepped to transmit different frequencies.

12. The monitoring and control apparatus of claim 9 further comprising;
    a collimating lens optically coupled to a laser, wherein said collimating lens receives laser output and forwards a collimated monitoring beam to a first detector and the input beam to said interferometer;
    a second detector optically coupled to output of said interferometer for receiving said output beam whose intensity varies as a function of the wavelength of the input beam; and
    a wavelength controller, coupled to output of said first detector and output of second detector, that generates an error signal for controlling output wavelength of said laser in accordance with intensity of said monitored beam and interferometer output signal.

13. A monitoring and control apparatus for an optical system, comprising:
    an interferometer comprising a body and first and second diffraction gratings coupled to parallel opposing sides of said body, wherein said interferometer introduces a pathlength difference for at least a portion of positive and negative diffraction rays that recombine to form an output beam having an intensity that varies as a function of wavelength of the input beam.

14. The monitor and control apparatus of claim 13 wherein the body is a four sided cube with a center axis and wherein said diffraction gratings are coupled to said parallel opposing sides asymmetrically about the center axis to introduce the pathlength difference between diffracted rays that are reflected off sidewalls of said cube prior to recombining.

15. The monitor and control apparatus of claim 13 wherein said body further comprises first and second sidewalls substantially perpendicular to said parallel opposing sides wherein said first sidewall is substantially flat and said second sidewall has a first step a first distance from said first sidewall and a second step a second distance from the first sidewall.

16. A method for monitoring and controlling an optoelectronic device, comprising:

splitting an incoming light into transmitted rays and reflected rays at a partially reflective interface between two prisms;

introducing a path length difference between at least a portion of the transmitted and reflected rays; and combining the transmitted and reflected rays having the path length difference to form an output beam having an intensity that varies as a function of wavelength of the input beam.

17. A method for monitoring and controlling an optoelectronic device, comprising:

splitting an incoming light into positive and negative diffractions orders;

introducing a path length difference between at least a portion of the positive and negative diffractions orders; and combining the positive and negative diffractions orders having the path length difference to form an output beam having an intensity that varies as a function of wavelength of the input beam.

* * * * *